US006965109B2

(12) United States Patent
Iwasawa

(10) Patent No.: US 6,965,109 B2
(45) Date of Patent: Nov. 15, 2005

(54) MULTISTAGE ACTIVE INFRARED SENSOR

(75) Inventor: Masashi Iwasawa, Ohtsu (JP)

(73) Assignee: Optex Co., Ltd., Shiga (JP)

(*) Notice: Subject to any disclaimer, the term of this patent is extended or adjusted under 35 U.S.C. 154(b) by 195 days.

(21) Appl. No.: 10/246,707

(22) Filed: Sep. 19, 2002

(65) Prior Publication Data
US 2003/0052273 A1 Mar. 20, 2003

(30) Foreign Application Priority Data
Sep. 19, 2001 (JP) .............................. 2001-284591

(51) Int. Cl.[7] .............................. G01J 5/02; G01V 8/20
(52) U.S. Cl. ................ 250/341.7; 250/221; 250/221.1; 340/556
(58) Field of Search ............................ 250/341.7, 221, 250/222.1; 340/555, 556, 557

(56) References Cited

U.S. PATENT DOCUMENTS

| 4,520,262 A | * | 5/1985 | Denton ........................ 250/221 |
| 4,650,990 A | * | 3/1987 | Jonsson ....................... 250/221 |
| 4,749,853 A | | 6/1988 | Salim |
| 5,198,799 A | * | 3/1993 | Pascale ........................ 340/552 |
| 5,670,778 A | * | 9/1997 | Smith .......................... 250/221 |
| 6,255,946 B1 | * | 7/2001 | Kim ............................ 340/556 |

FOREIGN PATENT DOCUMENTS

| DE | 2648631 | 5/1978 |
| DE | 3939191 A1 | 5/1991 |
| DE | 44 22 497 | 1/1996 |
| EP | 0919969 A2 | 6/1999 |
| GB | 2 278 916 | 12/1994 |
| JP | 8-171679 | 7/1996 |
| JP | 9-7084 | 1/1997 |
| JP | 9-297184 | 11/1997 |
| WO | 88/00745 | 1/1988 |

* cited by examiner

Primary Examiner—Albert Gagliardi
(74) Attorney, Agent, or Firm—Wenderoth, Lind & Ponack, L.L.P.

(57) ABSTRACT

In a multistage active infrared sensor, light emitters 11A, 11B, 11C emit infrared signals which contain distinct channel information. These light emitters 11A, 11B, 11C emit the infrared signals at different timings from each other. The sensor judges whether the infrared signals received by light receivers 12A, 12B, 12C contain channel information of opposite light emitters 11A, 11B, 11C. The sensor cancels any infrared signal which does not contain the channel information of the opposite light emitters 11A, 11B, 11C.

6 Claims, 3 Drawing Sheets

MULTISTAGE ACTIVE INFRARED SENSOR

BACKGROUND OF THE INVENTION

The present invention relates to an active infrared sensor utilized in a security system, etc. In particular, the present invention concerns a multi-stage active infrared sensor having a plurality of light emitting means and a plurality of light receiving means which are opposed one by one to the light emitting means across a watch area, and intends to improve reliability in the detection operation of this sensor.

In an example of the related art, Japanese Patent Laid-open Publication No. H8-171679 teaches an active infrared sensor which is applied to a security system in order to detect intrusion of a person into a watch area. This type of sensor is generally equipped with a light emitter containing a light emitting element and a light receiver containing a light receiving element. With the light emitter and the light receiver being opposed across a watch area, the light emitter projects an infrared beam toward the light receiver. If the infrared beam directed from the light emitter to the light receiver is interrupted by an intruder and thus the amount of beam received by the light receiving element changes, the sensor activates a security camera or reports to a security company.

As one of this type of sensors, there is also known a multistage active infrared sensor (also called a multi-beam sensor) having a plurality of light emitters and a plurality of light receivers which are opposed one by one to the light emitters across a watch area (e.g. Japanese Patent Laid-open Publication No. H9-297184).

In the case of the multistage active infrared sensor, an infrared beam emitted by each light emitter radiates in such a wide angle that the infrared beam may be received not only by an opposite light receiver but also by another irrelevant light receiver (which is called mutual interference between infrared beams) In particular, where the light emitters and the light receivers are spaced far apart (e.g. across a watch area with a width of about 100 meters), mutual interference of infrared beams tends to occur frequently.

Under the mutual interference between infrared beams, even when an intruder partially blocks the infrared beams emitted across a watch area, each light receiver still receives infrared beams from the opposite light emitter and another non-opposite light emitter. Therefore, the light receivers may not be able to detect the partial interruption of the infrared beams, and may eventually fail to give an alarm.

In an attempt to solve the undesirable situation caused by mutual interference between infrared beams, each light emitter is designed to emit an infrared beam at a different pulse frequency. In this case, the opposed light emitter and light receiver can operate as an independent sensor unit. When the light receiver receives an infrared beam from a non-opposite light emitter, the received signal is cancelled.

Nevertheless, in the case where each light emitter is designed to emit an infrared beam at a different pulse frequency, each light receiver has to be fitted with a high-performance filter in accordance with the respective channel (frequency). However, if the light emitters and the light receivers are disposed at a short distance, each light receiver receives an excessive quantity of infrared beams beyond the capacity of the filter. Hence, this attempt cannot eliminate mutual interference between infrared beams completely. Besides, mutual interference of infrared beams can occur for other reasons, for example, due to the installation environment of the sensor or worker's error in adjustment or setting. Further, addition of the filter raises the cost of the sensor.

SUMMARY OF THE INVENTION

The present invention is made in view of such drawbacks, and intends to provide a multistage active infrared sensor in which the light receiver is allowed to receive an infrared beam accurately and exclusively from the opposite light emitter, thereby totally avoiding mutual interference between infrared beams and improving reliability in the detection operation.

To achieve this object, a multistage active infrared sensor of the present invention is arranged to add distinct channel information to an infrared beam emitted by each light emitting means, and allows each light emitting means to emit an infrared signal at a different timing from the rest of the light emitting means.

To be specific, the present invention is based on a multistage active infrared sensor having a plurality of light emitting means and a plurality of light receiving means which are opposed one by one to the light emitting means across a watch area, wherein each light emitting means emits an infrared signal to an opposite light receiving means, and the sensor detects intrusion of an object into the watch area when the infrared signal is broken. This multistage active infrared sensor has a means for controlling a light emission operation and a means for recognizing a received light. The light emission control means supplies distinct channel information to an infrared signal to be emitted by each light emitting means, and allows each light emitting means to emit the infrared signal containing the channel information at a different timing from the rest of the light emitting means. The light recognition means, provided in each light receiving means, judges whether an infrared signal received by the respective light receiving means contains channel information of an opposite light emitting means, and cancels any received infrared signal which does not contain channel information of the opposite light emitting means.

According to this arrangement, each light emitting means emits an infrared signal toward the opposite light emitting means at a different timing from the rest of the light emitting means. Therefore, the light receiving means does not receive infrared signals from more than one light emitting means at a time. Besides, the infrared signal from each light emitting means carries distinct channel information. Hence, based on the channel information of the received infrared signal, the light recognition means in the light receiving means judges whether the received infrared signal is emitted by the opposite light emitting means. Only if the signal comes from the opposite light emitting means, the light recognition means considers the signal to be valid. In other words, if any light receiving means fails to receive an infrared signal containing the channel information of the opposite light emitting means for a certain period of time, the light recognition means determines intrusion of an object (e.g. a person) in the watch area. The resulting sensor is capable of performing a reliable object detection operation, without being affected by mutual interference between infrared beams. Moreover, this sensor can do without high-performance filters which have to be designed for the respective channels, thereby being obtainable at a lower cost.

Each light emitting means can emit an infrared signal in a following manner. Specifically, the light emission control means provides the infrared signal with a data packet which contains the channel information indicative of each light emitting means and any other predetermined data signal.

In this case, the predetermined data signal, contained in the data packet together with the channel information and added to the infrared signal, is an object intrusion detection signal transmitted from another active infrared sensor.

Such arrangements enable the infrared signal to carry various information. In particular, with incorporation of an object intrusion detection signal transmitted from another active infrared sensor, the infrared signal emitted by the light emitting means can also serve as a means for transmitting the detection signal. In such circumstances, a plurality of active infrared sensors can monitor a plurality of watch areas, with an improved serviceability.

DESCRIPTION OF THE PREFERRED EMBODIMENTS

An embodiment of the present invention is hereinafter described with reference to the drawings. This embodiment concerns a system which is applied to a security system or the like installed for nighttime security in an office, factory, etc. and which serves to detect an intruder who enters its monitoring area (watch area). In the following description, the multistage active infrared sensor of the present invention is understood to be applied to the polling system.

Figure 1:
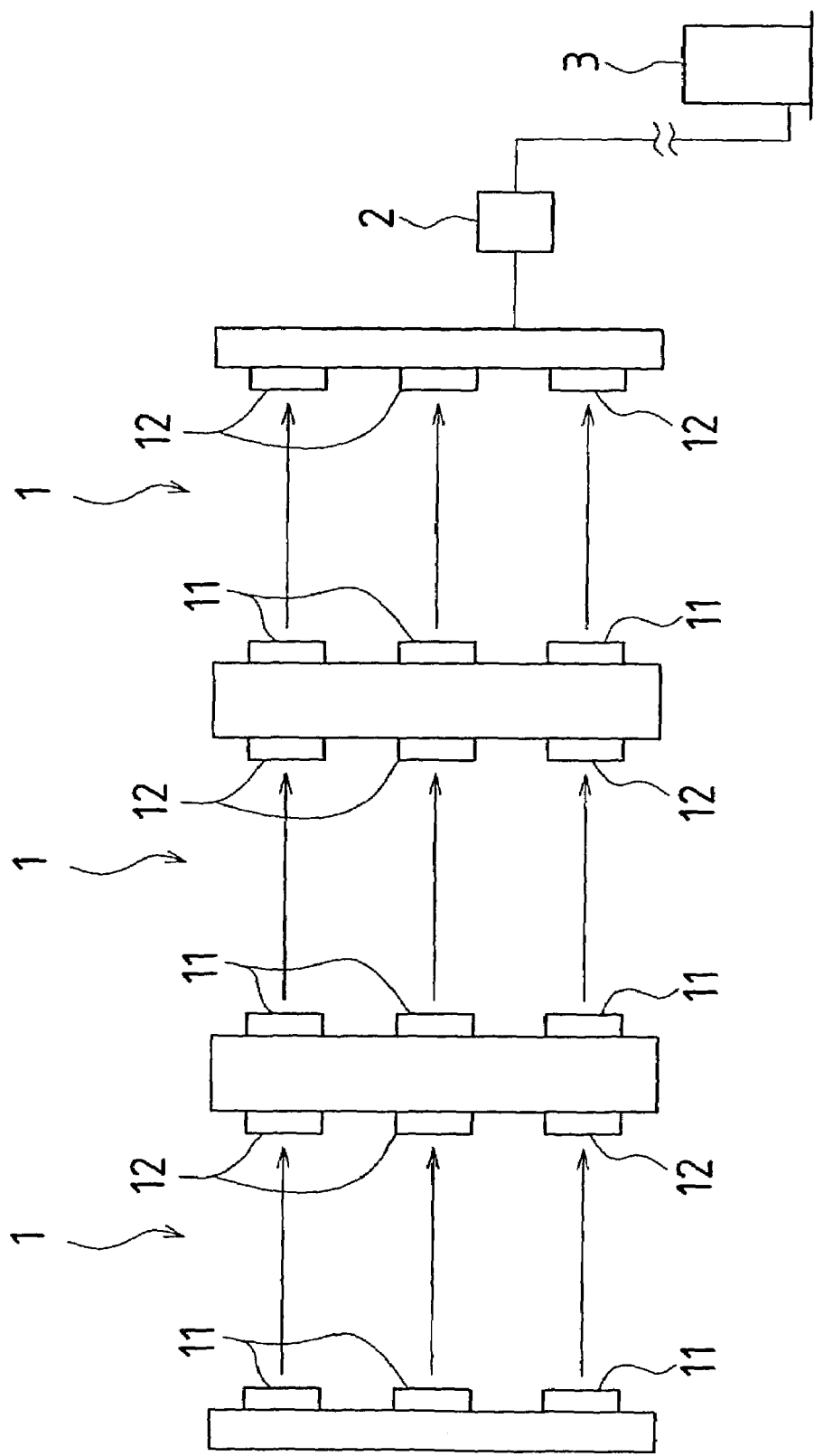
FIG. 1 shows a schematic structure of the security system concerning the present embodiment.

The polling system is constituted with a plurality of infrared sensors. When any of the infrared sensors detects an intruder and generates a signal, the detection signal is successively transmitted, together with an infrared pulse signal, to the infrared sensor(s) located downstream along the direction of transmission. From the infrared sensor at the downstream end along the transmission direction, the detection signal is sent to a receiver. Specifically, referring to FIG. 1 (which shows a schematic structure of this system), the alarm system of this embodiment utilizes a plurality of (three in the system of FIG. 1) active infrared sensors 1, 1, 1. In detail, each active infrared sensor 1 has a plurality of vertically disposed light emitters 11, 11, 11 (as light emitting means) and a plurality of light receivers 12, 12, 12 (as light receiving means). The light emitters 11, 11, 11 and the light receivers 12, 12, 12 are opposed to each other across a monitoring area. In each sensor shown in FIG. 1, three light emitters 11, 11, 11 and three light receivers 12, 12, 12 are aligned in the vertical direction.

Regarding the adjacent sensors 1, 1, the light receivers 12, 12, 12 of the upstream sensor 1 and the light emitters 11, 11, 11 of the downstream sensor 1 are of integrated structure and connected such that a detection signal can be transmitted from the former to the latter. Each light emitter 11, which emits an infrared pulse signal to the opposite light receiver 12, is made capable of adding a detection signal to the infrared pulse signal. Therefore, when any of the infrared sensors 1 detects an intruder and generates a signal, the detection signal is successively transmitted to the infrared sensor(s) 1 located downstream along the transmission path (the right sensor(s) in the figure). Finally, from the infrared sensor 1 located at the downstream end of the transmission path, the detection signal is sent to a receiver 2.

The receiver 2 is connected, for example, with a management server 3 at a security company. When a detection signal is sent from the sensor 1, the receiver 2 reports (i.e. sends an alarm signal) to the management server 3.

Now, the feature of the infrared sensors 1 is detailed below. Since their structure is substantially the same, it should be understood, for the purpose of description, that the infrared sensors 1 are represented by the one located at the downstream end of the transmission path.

Figure 2:
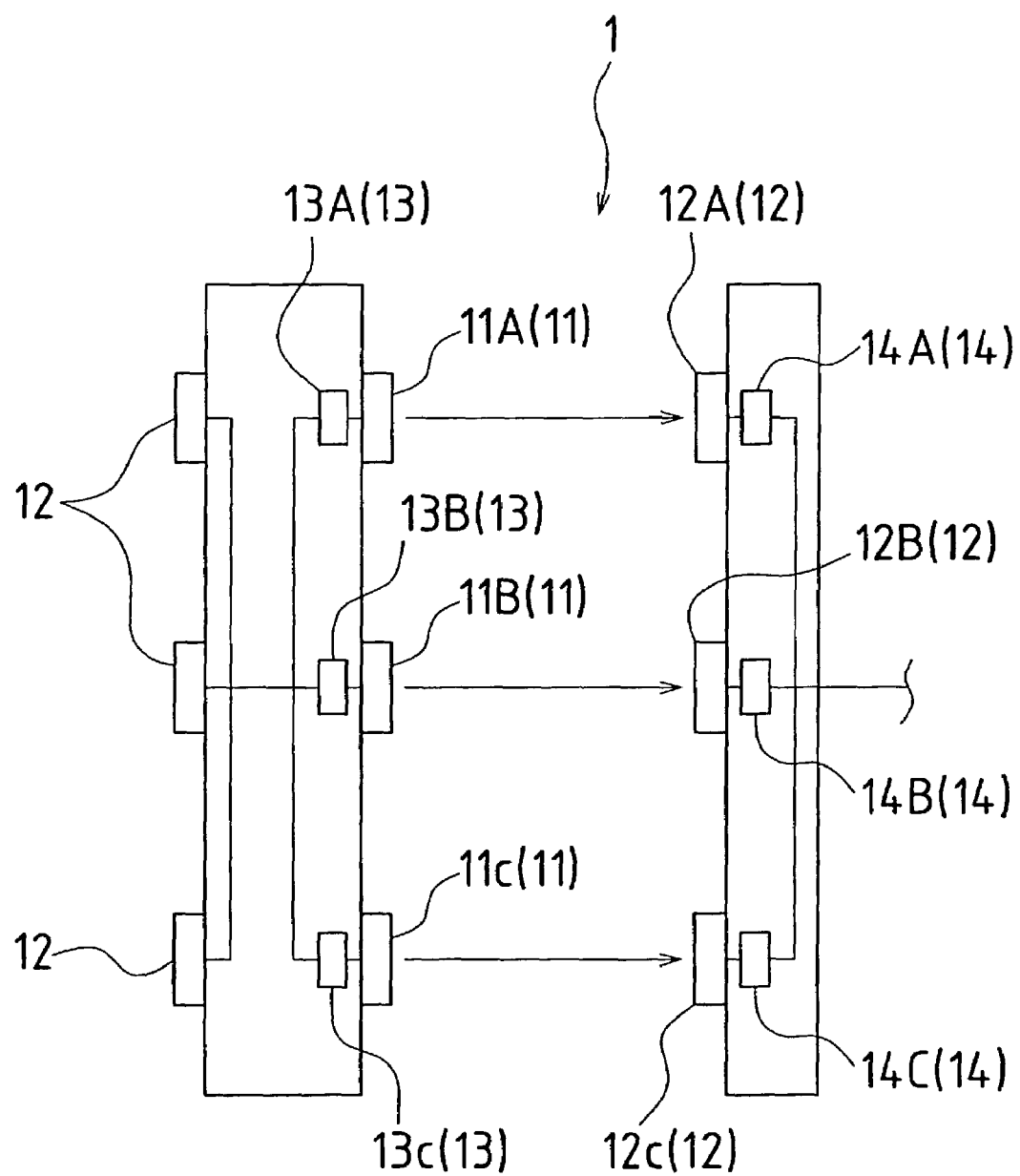
FIG. 2 shows a schematic structure of the infrared sensor.

FIG. 2 shows a schematic structure of the infrared sensor 1. As illustrated, light emitters 11, 11, 11 of this infrared sensor 1 are integrated with light receivers 12, 12, 12 of an infrared sensor 1 on the upstream side, such that the light emitters 11, 11, 11 can receive detection signals from the light receivers 12, 12, 12.

The light emitters 11, 11, 11 are respectively equipped with light emission controllers 13, 13, 13 which constitute light emission control means. Each light emission controller 13 supplies preset channel information to an infrared signal to be emitted by its relevant light emitter 11. For example, the light emission controller 13A for the first light emitter 11A (the top emitter in FIG. 2) assigns channel information "1" to an infrared signal to be emitted by the first light emitter 11A. Likewise, the light emission controller 13B for the second light emitter 11B (the middle emitter in FIG. 2) assigns channel information "2" to an infrared signal to be emitted by the second light emitter 11B. Also, the light emission controller 13C for the third light emitter 11C (the bottom emitter in FIG. 2) assigns channel information "3" to an infrared signal to be emitted by the third light emitter 11C. In this manner, the infrared signals produced by the light emitters 11A, 11B, 11C carry distinct channel information. Accordingly, the infrared signal produced by each of the light emitters 11A, 11B, 11C contains, as a data packet, an object intrusion detection signal (a detection signal) transmitted from another active infrared sensor and the channel information added by the respective light emission controller.

Figure 3:
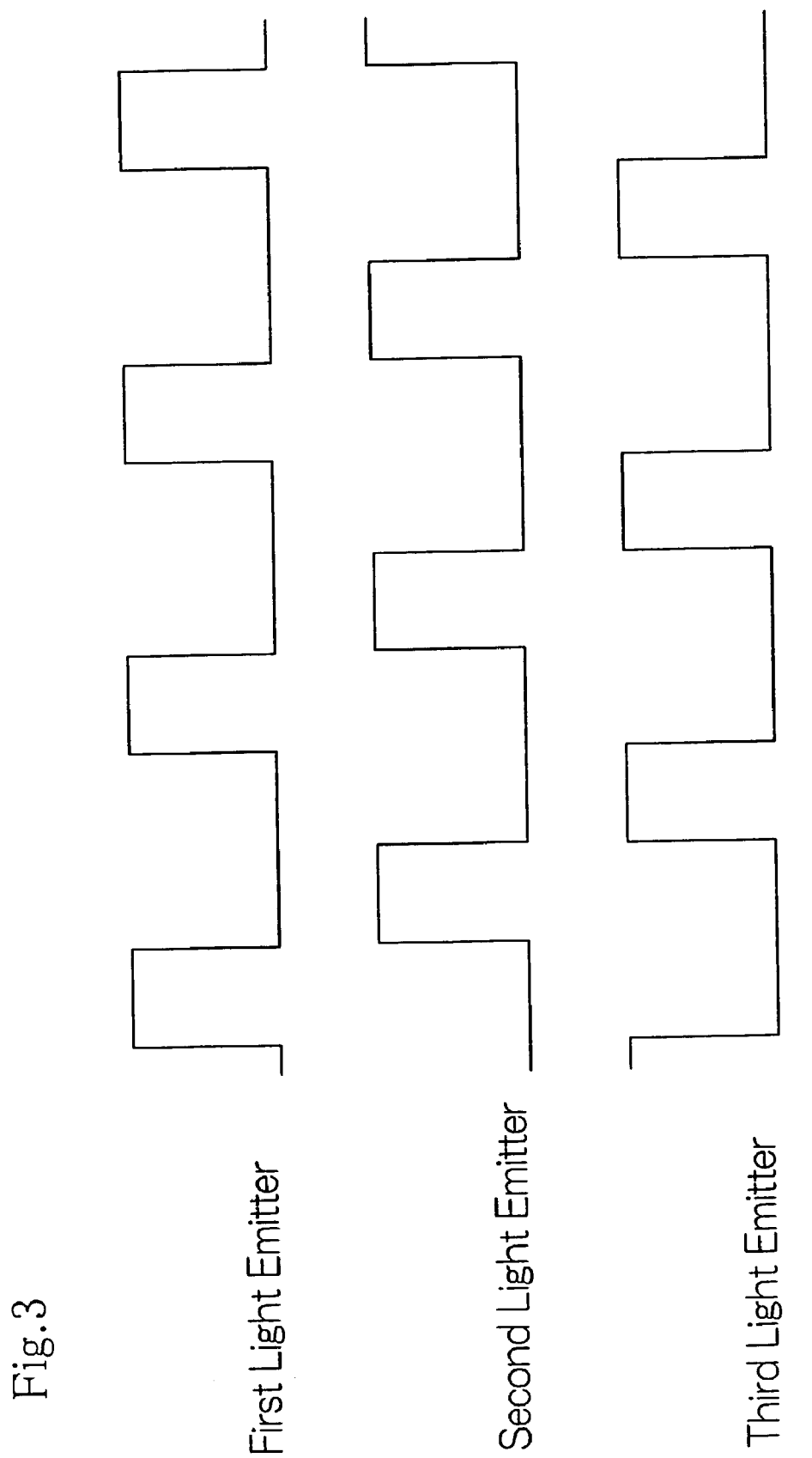
FIG. 3 is a timing chart which represents emission timings of infrared signals by respective light emitters.

As another function of the light emission controllers 13, each light emission controller 13 is arranged to communicate with the other light emission controllers 13, 13, and to effect an emission operation by the relevant light emitter 11 at such a timing that does not coincide with emission operations by the light emitters 11 of the other light emission controllers 13, 13. In other words, through the mutual communications among the light emission controllers 13A, 13B, 13C, only one light emitter 11 is allowed to effect an emission operation at a time. According to a typical, but non-limitative, emission timing of infrared signals among the light emitters 11A, 11B, 11C, the first light emitter 11A effects the emission operation firstly, which is immediately followed by the emission operation of the second light emitter 11B, which is further followed by the emission operation of the third light emitter 11C, which in turn is followed by the emission operation of the first light emitter 11A. Thus, an infrared signal emission cycle is established in the order of the light emitters 11A, 11B, 11C. FIG. 3 is a timing chart which represents emission timings of infrared signals by the light emitters 11A, 11B, 11C. To summarize, an infrared signal is constantly emitted by any of the light emitters 11A, 11B, 11C, while the light emission controllers 13A, 13B, 13C control the emission timings of infrared signals by the light emitters 11A, 11B, 11C in such a manner that more than one of the light emitters 11A, 11B, 11C do not emit infrared signals simultaneously. As described above, the light emission controllers 13A, 13B, 13C constitute the light emission control means as called in this invention.

Now, referring to the light receivers 12, 12, 12 of the infrared sensor 1, they are respectively equipped with light recognition units 14, 14, 14 as light recognition means. Each light recognition unit 14 judges whether the infrared signal received by the light receiver 12 contains the channel information of the opposite light emitter 11. If the received infrared signal does not carry the channel information of the opposite light emitter 11, the light recognition unit 14 cancels the received infrared signal. To be specific, the light recognition unit 14A for the first light receiver 12A (the top receiver in FIG. 2) considers only the infrared signal containing the channel information "1" to be valid, whereas it disregards any infrared signal containing other channel information. Likewise, the light recognition unit 14B for the second light receiver 12B (the middle receiver in FIG. 2) considers only the infrared signal containing the channel information "2" to be valid, whereas it disregards any infrared signal containing other channel information. Also, the light recognition unit 14C for the third light receiver 12C (the bottom receiver in FIG. 2) considers only the infrared signal containing the channel information "3" to be valid, whereas it disregards any infrared signal containing the other channel information.

The infrared sensors 1 of the above arrangement operate in the following manner.

First of all, each infrared sensor 1 allows the light emitters 11, 11, 11 to send infrared signals to the light receivers 12, 12, 12. The light emitters 11, 11, 11 produce the infrared signals at the above-described emission timings, in the order of the light emitters 11A, 11B, 11C (see FIG. 3).

The infrared signal produced by each of the light emitters 11A, 11B, 11C contains, as a data packet, an object intrusion detection signal (a detection signal) from another active infrared sensor 1 and the channel information. Namely, the infrared signal emitted by the first light emitter 11A contains channel information "1", the infrared signal emitted by the second light emitter 11B contains channel information "2", and the infrared signal emitted by the third light emitter 11C contains channel information "3".

While the light receivers 12, 12, 12 receive the infrared signals, each light recognition unit 14 judges whether the infrared signal received by the light receiver 12 contains the channel information of the opposite light emitter 11. If the received infrared signal does not carry the channel information of the opposite light emitter 11, the light recognition unit 14 cancels the received infrared signal. To summarize, each light recognition unit 14 considers only the infrared signal emitted by the opposite light emitter 11 to be valid. Then, the unit 14 determines the presence or absence of an object, based on whether the valid infrared signal is broken or not.

When any of the infrared sensors 1 detects a person and generates a signal, the detection signal is successively transmitted, together with an infrared signal, to the infrared sensor(s) 1 located downstream along the transmission path. From the infrared sensor 1 located at the downstream end of the transmission path, the detection signal is sent to the receiver 2, which in turn reports to the management server 3.

According to the above-described embodiment, the light emitters 11A, 11B, 11C emit infrared signals to the light receivers 12A, 12B, 12C, at different timings from each other. Under this condition, the light receivers 12A, 12B, 12C can always receive the infrared signals emitted from the opposite light emitters 11A, 11B, 11C, respectively. As a result, it is possible to prevent the undesirable situation where each light receiver 12 receives infrared signals from more than one light emitters 11A, 11B, 11C simultaneously. From another point of view, the infrared signal from each light emitter 11 is assigned with the distinct channel information. Based on the channel information, the sensor can determine whether the infrared signal received by each light receiver 12 originates from the opposite light emitter 11A, 11B, 11C. Owing to this arrangement, even if infrared beams may interfere with each other, the sensor can ensure a reliable object detection operation without being affected by such mutual interference. Additionally, as conventionally practiced, the light emitters may be arranged to emit infrared beams of different pulse frequencies. In this case, although the conventional technology has to fit high-performance filters in accordance with the respective channels, the sensor of the present embodiment requires no such filters and thus is obtainable at a lower cost.

In the above embodiment, the light emitters 11A, 11B, 11C are respectively equipped with the light emission controllers 13A, 13B, 13C. Through mutual communications among the light emission controllers 13A, 13B, 13C, only one light emitter 11 is allowed to perform an emission operation at a time. Instead, the sensor of the present invention may utilize a single controller in order to perform unified management of emission operations by the light emitters 11A, 11B, 11C, thereby allowing only one light emitter 11 to perform an emission operation at a time.

As for the emission timing of the infrared signal by the light emitters 11A, 11B, 11C, the emission operations are effected in the order of the first, second and third light emitters, in the non-limitative example mentioned above. Alternatively, the light emitters 11A, 11B, 11C may be arranged to emit infrared signals at random. In any case, however, infrared signals should not be emitted by more than one light emitters 11A, 11B, 11C at the same time.

What is claimed is:

1. A multistage active infrared sensor having a plurality of light emitting means and a plurality of light receiving means which are opposed one by one to the light emitting means across a watch area, wherein each light emitting means emits an infrared signal to an opposite light receiving means, and the sensor detects intrusion of an object into the watch area when the infrared signal is broken, the multistage active infrared sensor comprising:
a means for controlling a light emission operation, which supplies distinct channel information to an infrared signal to be emitted by each light emitting means and which allows each light emitting means to emit the infrared signal containing the channel information at a different timing from the rest of the light emitting means, and
a means, provided in each light receiving means, for recognizing a received light, which judges whether an infrared signal received by the respective light receiving means contains channel information of an opposite light emitting means, and which cancels any received infrared signal which does not contain channel information of the opposite light emitting means
wherein said plurality of light emitting means are each at a first single location, said plurality of light receiving means are each at a second single location and said watch area is defined as an area between said first location and said second location.

2. A multistage active infrared sensor according to claim 1, wherein the light emission control means provides the infrared signal with a data packet which contains the distinct channel information indicative of each light emitting means and any other predetermined data signal.

3. A multistage active infrared sensor according to claim 2, wherein the predetermined data signal, contained in the data packet together with the channel information and added to the infrared signal, is an object intrusion detection signal transmitted from another active infrared sensor.

4. A multistage infrared sensor comprising:

a plurality of light emitters at a first single location and a plurality of respective light receivers at a second single location positioned so as to be opposed to each other across a watch area that is between said first location and said second location, wherein each of said plurality of light emitters can emit an infrared light signal across the watch area to a respective opposite one of said light receivers in order to detect intrusion into the watch area when the infrared light signal is broken;

means for controlling light emission operation of said plurality of light emitters so that distinct channel information is supplied to the infrared light signal of each of said plurality of light emitters and so that each of said plurality of light emitters emits the infrared light signal at a different timing than the others of said plurality of light emitters; and means provided with said plurality of light receivers for recognizing light received by each of said plurality of light receivers, judging whether an infrared light signal received by each of said respective light receivers contains channel information of a corresponding opposite one of said plurality of light emitters, and canceling received infrared light signals which do not contain channel information of the corresponding opposite one of said plurality of light emitters.

5. The multistage infrared sensor of claim 4, wherein said means for controlling light emission operation provides the infrared light signal of each of said plurality of light emitters with a data packet which contains the distinct channel information indicative of the respective one of said plurality of light emitters and a predetermined data signal.

6. The multistage infrared sensor of claim 5, wherein the predetermined data signal is an object intrusion detection signal transmitted from another active infrared sensor.

* * * * *